(No Model.)
J. P. L. SIMON & C. ABELE.
APPARATUS FOR COOLING AIR.
No. 267,114.  Patented Nov. 7, 1882.
Fig. 1.
Fig. 3.
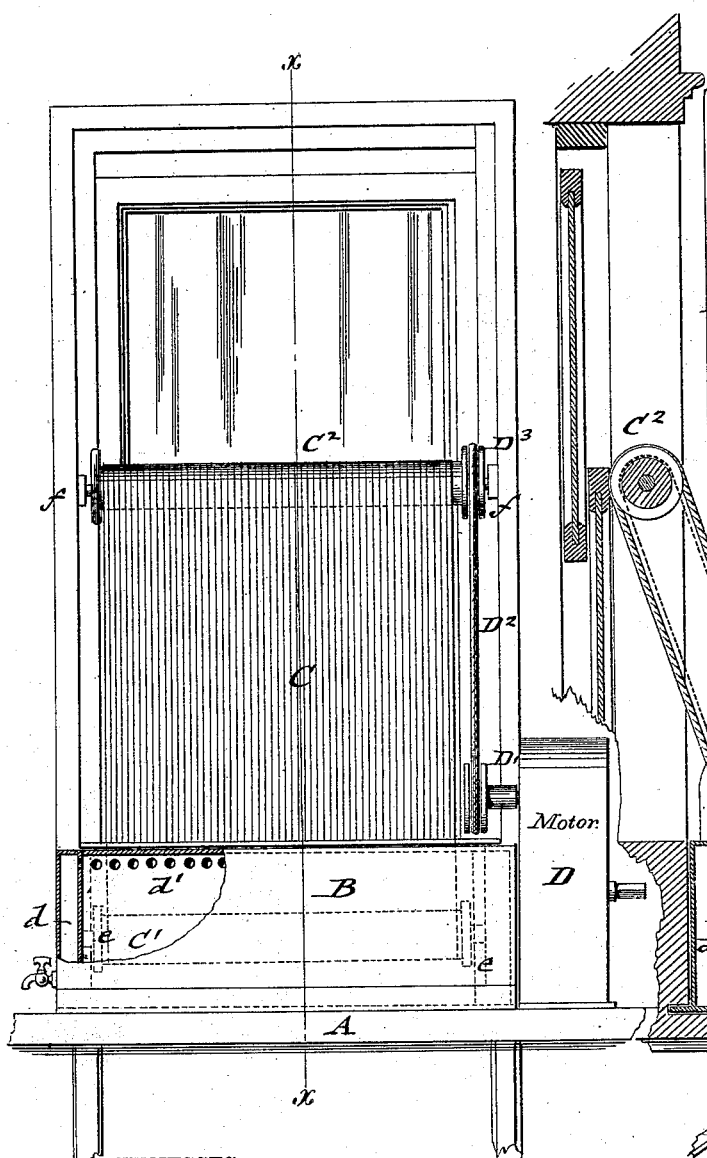
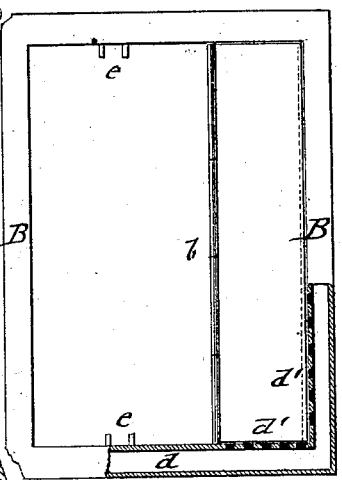
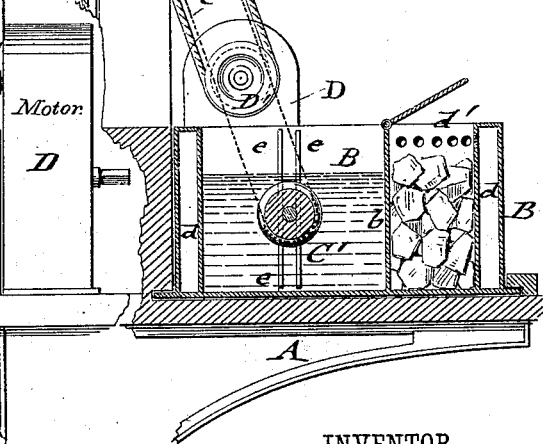
Fig. 2.
WITNESSES:
Gustave Dieterich
Otto Risch
INVENTOR
John P. L. Simon
and Charles Abele
BY Paul Goepel
ATTORNEY

UNITED STATES PATENT OFFICE.

JOHN P. L. SIMON AND CHARLES ABELE, OF NEW YORK, N. Y.

APPARATUS FOR COOLING AIR.

SPECIFICATION forming part of Letters Patent No. 267,114, dated November 7, 1882.

Application filed March 1, 1882. (No model.)

*To all whom it may concern:*

Be it known that we, JOHN P. L. SIMON and CHARLES ABELE, of the city, county, and State of New York, have invented certain new and useful Improvements in Apparatus for Cooling Air, of which the following is a specification.

The object of this invention is to furnish an improved apparatus for cooling and disinfecting the atmospheric air of private residences, offices, stores, hotels, theaters, and hospitals, and other places; and the invention consists of an endless apron which is stretched over rollers, the upper one of which is applied to the window-frame, while the lower revolves in a tank or vessel supported on a bracket below the window-sill. The tank is filled with water cooled by ice in an ice-chamber, the tank and ice-chamber being surrounded by a non-conducting air-space inclosed by double walls. A spring or other motor imparts a slow motion to the evaporating-apron, so that a large evaporating-surface is continually exposed to the air passing in through the opened window.

In the accompanying drawings, Figure 1 represents a front elevation of a window with our improved apparatus for cooling the air. Fig. 2 is a vertical transverse section on line $x\ x$, Fig. 1, and Fig. 3 a plan, partly in section, of the water-tank of the same.

Similar letters of reference indicate corresponding parts.

In the drawings, A represents a bracket, which is applied below the window-sill and adapted to support a sheet-metal box or tank, B, which is retained on the bracket by means of guide-rails, and readily placed in position thereon or removed therefrom for the purpose of being cleaned. The tank B is divided by a longitudinal partition, $b$, into two compartments, the smaller of which is filled with broken ice, while the larger one is filled with plain or medicated water. The entire tank B is made of double walls, so as to form a non-conducting air-space, $d$, around the same. The air-space is closed at the top and bottom, and connected with the ice-chamber by means of holes $d$, arranged in the walls of the latter near its lid. Vertical guide-strips $e$ are arranged at the inner side walls of the tank, the strips serving as a bearing for the lower guide-roller, C', of an endless evaporating-apron, C, which is made of cotton, wool, or other fabric which readily absorbs water, the fabric being woven in such a manner as to admit the ready passage of the air. The endless apron C is stretched over a second roller, $C^2$, which turns in bearings $f\ f$, applied to the window-frame, preferably at a level with or somewhat above the level of the meeting-rails of the sashes. A suitable spring or other motor, D, such as a strong clock-train, is arranged at one end of the tank B, and serves to give motion by means of a transmitting-pulley, D', and belt $D^2$, to a fixed pulley, $D^3$, on the upper roller, $C^2$, of the endless evaporating-apron C. The clock-work D and its transmitting mechanism D' $D^2$ are so constructed that a slow but continuous motion is imparted to the evaporating-apron. The lower roller and the lower part of the apron are immersed into the water of the tank, so that the fabric, in passing through the cold water, is charged with moisture. The so-moistened apron is exposed to the air passing in through the open window, exposing thus two moist surfaces to the air. A continuous evaporation takes place, by which the temperature of the room is reduced 15° to 20° Fahrenheit, according to the temperature of the water employed. When the apparatus is in motion it is preferable to close the windows in the room, with the exception of one window on the other side, and open the upper sash about two or three inches, so as to give an exit to the warm air in the room. The lowering of the temperature in the room keeps up a natural ventilation and replaces gradually the dry and hot air of the room with fresh cool air. By dissolving disinfectants in the water contained in the tank the air will be impregnated with such disinfectants, which is specially useful for hospitals and sick-rooms.

By perfuming the water an evenly-distributed odor may be given to the air in the room.

We are aware that endless evaporating-aprons which are guided over rollers and supplied with moisture are well known, and we therefore do not broadly claim the same.

Having thus described our invention, we claim as new and desire to secure by Letters Patent—

1. The herein-described apparatus for cooling atmospheric air, consisting of a water-tank, an endless evaporating-apron, the lower roller of which is vertically guided within the tank, while the upper is mounted to the window-frame, and of a suitable motor and transmitting mechanism, whereby a slow continuous motion is imparted to the evaporating-apron, substantially as and for the purpose set forth.

2. The combination of a refrigerating-tank supported on a level with or below the window-sill, said tank being provided with an ice-chamber, with an endless evaporating-apron stretched on rollers, the lower one of which is vertically guided within the tank, while the upper one is applied to the window-frame, and with a suitable motor for imparting a slow and continuous motion to the apron, substantially as set forth.

3. The combination of a water-tank having an ice-chamber and a surrounding air-chamber, an endless evaporating-apron, the lower guide-roller of which is vertically movable in interior guides of the tank, while the upper roller is mounted to the window-frame, a suitable motor, and transmitting mechanism connecting the motor with the upper roller of the apron, substantially as specified.

In testimony that we claim the foregoing as our invention we have signed our names in presence of two subscribing witnesses.

JOHN P. L. SIMON.
CHARLES ABELE.

Witnesses:
PAUL GOEPEL,
CARL KARP.